United States Patent [19]

van der Heijden

[11] Patent Number: 5,340,444

[45] Date of Patent: Aug. 23, 1994

[54] CIRCULATION COOLER FOR VACUUM DISTILLATION APPARATUS

[75] Inventor: Peter W. D. van der Heijden, Doerentrup, Fed. Rep. of Germany

[73] Assignee: Peter W. D. van der Heijden Laborbedarf, Doerentrup, Fed. Rep. of Germany

[21] Appl. No.: 79,600

[22] Filed: Jun. 22, 1993

[51] Int. Cl.$^5$ .......................... B01D 3/10; B01D 3/42
[52] U.S. Cl. ..................... 202/186; 202/183; 202/185.4; 202/185.6; 202/205; 202/238; 203/1; 203/41; 203/87; 203/91; 203/DIG. 16
[58] Field of Search ...................... 202/205, 185.4, 186, 202/238, 185.5, 185.6, 183, 91, 87, 1, 42, 41, DIG. 16; 159/901, DIG. 16; 62/183, 185, 498

[56] References Cited

U.S. PATENT DOCUMENTS

| | | | |
|---|---|---|---|
| 2,675,346 | 4/1954 | MaClean | 202/153 |
| 3,219,551 | 11/1965 | Carel et al. | 202/161 |
| 3,416,999 | 12/1968 | Shepherd et al. | 202/161 |
| 3,607,662 | 9/1971 | Glover | 202/161 |
| 4,238,451 | 12/1980 | Ciais et al. | 202/161 |
| 4,406,745 | 9/1983 | Martel | 202/161 |
| 5,164,049 | 11/1992 | Clark et al. | 202/186 |

FOREIGN PATENT DOCUMENTS

| | | |
|---|---|---|
| 3001995 | 7/1981 | Fed. Rep. of Germany . |
| 3248501 | 7/1984 | Fed. Rep. of Germany . |
| 0255642 | 10/1970 | U.S.S.R. ............................ 202/161 |

OTHER PUBLICATIONS

Carpenter et al, "Continuous Fractionating Columns for Pilot Plants", Industrial and Engineering Chemistry, vol. 42, No. 3, pp. 571–578.

Primary Examiner—Virginia Manoharan
Attorney, Agent, or Firm—Browdy and Neimark

[57] ABSTRACT

A circulation cooler (10) has a heat exchanger (12) in a housing (11) that contains a cooling liquid and is detachably connected by its forward flow (13) to an inlet line (5), and by its return line (14) to the outlet (6) of a condenser (4) of a distillation apparatus (1). The circulation cooler (10) moreover has a vacuum pump (21) inside its housing (11) and an absorber (28) outside its housing (11). A second condenser (24) is interposed along the cooling agent inlet line (13) between the circulation cooler (10) and the condenser (4) of the distillation apparatus (1), and is connected to a vacuum line (27). The cooling liquid (25) flows successively to the heat exchanger (12) through the two condensers (24, 4), then back to the heat exchanger (12). In both condensers, which are under a vacuum through common vacuum line (26, 27), the condensation of the liquid substances is effected in the form of main condensation and aftercondensation phases. Any aerosols which still pass through the vacuum pump (21) are captured by the absorber (28).

10 Claims, 1 Drawing Sheet

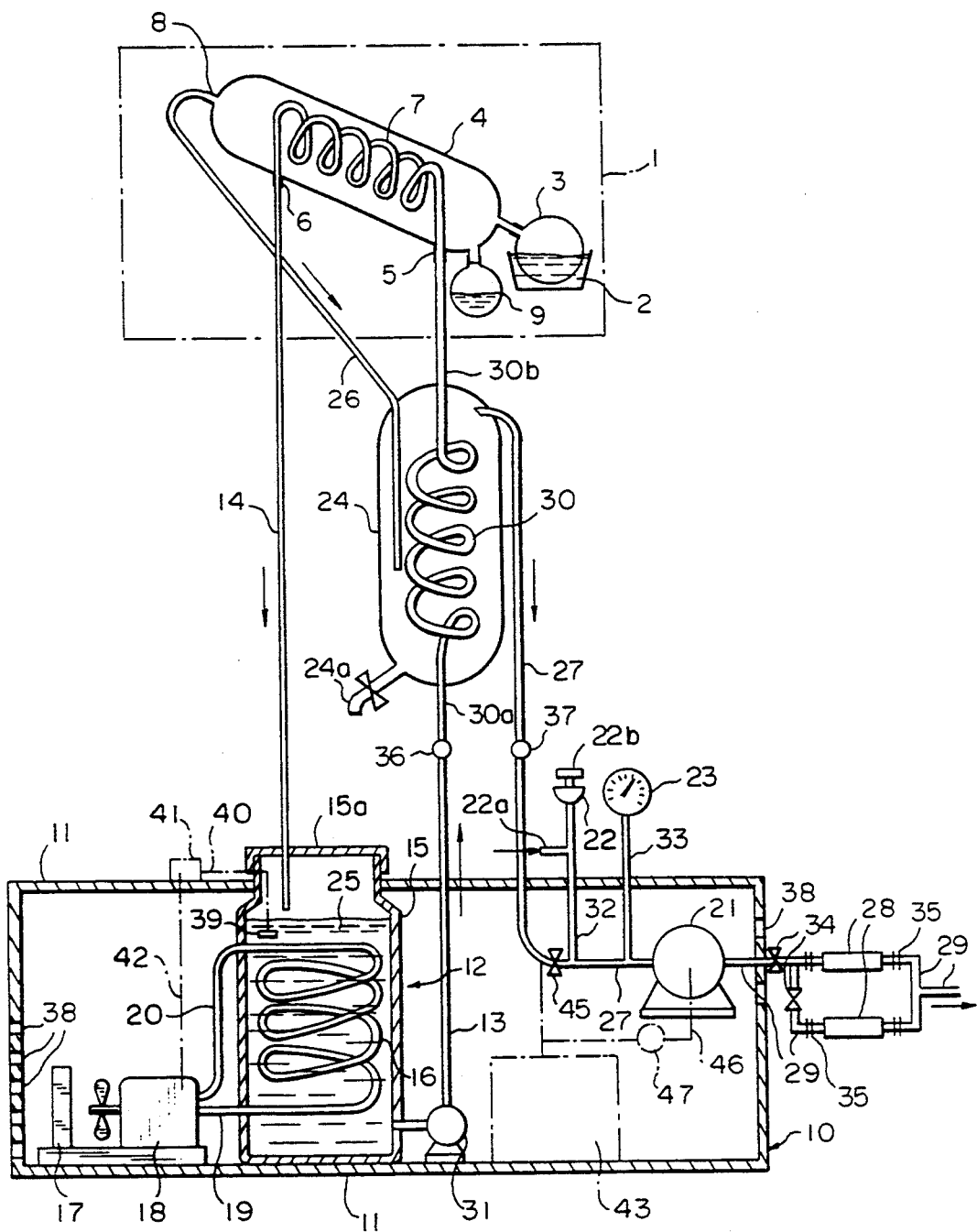

CIRCULATION COOLER FOR VACUUM DISTILLATION APPARATUS

FIELD OF THE INVENTION

The present invention relates to a circulation cooler with a heat exchanger disposed in a housing, a cooling unit and vacuum pump, to whose coolant inlets and outlets and vacuum line a distillation apparatus in the form of a rotary evaporator can be attached. Liquid substances can be condensed in the cooling loop in a vacuum.

BACKGROUND OF THE INVENTION

A circulation cooler for vacuum distillation apparatus that is designed and operates in this way has become known from German Published, Non-Examined Patent Application DE-OS 32 48 501, and has proven valuable in use. However, it would be advantageous to be able to improve the cooling and condensation functions of this prior device.

SUMMARY OF THE INVENTION

Accordingly, it is an object of the present invention to further improve the circulation cooler of DE-OS 32 48 501, especially with regard to its cooling and condensation functions, by achieving and assuring a better cooling effect, optimal condensation and absolutely complete recovery of the vapors through certain simple changes and a different arrangement of the functioning parts.

A further object of the present invention is to provide means for attaining the above improved features of the present invention.

It is yet a further object of the present invention to provide an improved circulation cooler for vacuum distillation apparatus.

These and other objects of the present invention are achieved by the circulation cooler for vacuum distillation apparatus as further described hereafter, and more particularly a circulation cooler with which economical cooling and generation of a vacuum for rotary evaporators have been achieved. The vacuum is generated by an adjustable vacuum pump, and cooling is effected by means of a liquid, preferably water, carried in a loop, i.e. recirculated, so that only a specific, predetermined quantity of water is necessary for cooling, and no waste water is produced.

The predetermined quantity of water is carried in an advantageous manner in a closed loop and thus constantly remains the same. Because of this, the cooling system cannot be impaired by calcification or become contaminated by other sources, such as algae, because no new in-flowing water is necessary which constantly needs replenishment. Furthermore, the temperature of this quantity of cooling water can be easily regulated, which assures a constant and controllable vacuum.

Air and consequently environmental pollution are avoided by means of the assured condensation and absorption of the vapors. The circulation cooler in accordance with the invention has a simple, economical and compact design, can easily be connected to the distillation apparatus and functions in a manner that is reliable and can be maintained over a long period of time.

By means of the additional arrangement of a second condenser outside the circulation cooler, vapors still exiting the first condenser are aftercondensed. Thus, 100% condensation is achieved. By means of this aftercondenser disposed outside the circulation cooler, solvent removal is extremely simple and practical because it requires merely the opening of the stop valve, which, if this condenser were built into the circulation cooler housing, would require a laborious partial disassembly. The condensation effect is significantly improved by carrying the coolant in succession through two condensers, thus making the cooling effect more intensive as well.

The absorber is likewise disposed outside the circulation cooler housing and downstream of the vacuum pump. This absorber needs only to collect the aerosols still passing through the vacuum pump, which have no effect on the vacuum pump and are received in an assured manner by the absorber. The arrangement of the absorber outside the circulation cooler greatly simplifies the replacement of its filters.

The additional arrangement of the aftercondenser between the main condenser and the circulation cooler has an advantageous effect on the vacuum pump due to optimum cooling and condensation. This is because it is no longer hindered by vapors, it lasts longer and its noise level is greatly reduced.

BRIEF DESCRIPTION OF THE DRAWINGS

The sole FIGURE shows an embodiment of a circulation cooler for a vacuum distillation apparatus according to the present invention.

DETAILED DESCRIPTION OF THE PREFERRED EMBODIMENT

An exemplary embodiment of the invention that is described in more detail below is shown in the drawing. The single FIGURE of the drawing is a schematic representation of a vertical section through a circulation cooler with a detachably connected vacuum distillation apparatus.

A vacuum distillation apparatus (1), preferably a rotary evaporator, comprises a rotary flask (3) which is heatable by a water bath (2) and which contains the liquid substance to be distilled, and a condenser (4) on which the rotary flask (3) is disposed. This condenser (4) has an inlet (5) and an outlet (6) for a cooling coil (7) disposed in the condenser (4) carrying a coolant, preferably a cooling liquid (25), and further has a vacuum connection (8) and a receiving flask (9) for the distilled substance.

For circulation cooling of this rotary evaporator (1), a circulation cooler or cooling device (10) is provided with a housing (11) on which the rotary evaporator (1) can be placed or which can be otherwise connected thereto, such as either in a spaced-apart fashion or not, wherein the two devices (1, 10) thus form a detachable structural unit.

A heat exchanger (12) containing the cooling liquid, such as water, is disposed in the circulation cooler housing (11) and is detachably connected via a forward flow line (13) and a return line (14) respectively to the inlet (5) and outlet (6), each in the form of a connecting branch of the condenser (4), so that the cooling liquid (25) flows in the loop between the cooling coil (7) of the condenser (4) and the heat exchanger (12).

The heat exchanger (12) in turn comprises a reservoir (15) for the cooling liquid and a cooling coil (16) disposed therein. The reservoir (15) projects slightly out of the upper side or roof of the housing (11) with its reservoir neck, and is sealed by a cap or lid (15a). To cool the liquid in the reservoir (15) and generate a constant cooling temperature, a cooling unit formed by an air cooler (17) and a compressor (18) is provided in the housing (11) and is connected to the cooling coil (16) in the reservoir (15) via forward flow and return lines (19, 20).

The circulation cooler housing (11) has a vacuum pump (21) at a distance from the heat exchanger (12). This pump (21) is connected indirectly to the condenser (4) and is equipped with a vacuum adjustment device (22) and a vacuum measurement device (23) provided outside the housing (11) for readings and adjustments.

The condenser (4) forms the main condenser for the distillation process. Vapors that slip through this main condenser (4), i.e. vapors which are not completely condensed, are received by a second condenser (24) which functions as an aftercondenser for executing the complete condensation. This second condenser (24) is disposed outside the circulation cooler housing (11) and is detachably connected to the circulation cooler (10) and the first condenser (4).

The second condenser (24) is provided along the inlet line (13) for the cooling liquid (25) that leads from the heat exchanger (12) of the circulation cooler (10) to the first condenser (4) and forms the forward flow. In addition, the second condenser (24) is detachably connected both to the first condenser (4) via a vacuum line (26) exiting from the vacuum connection (8), and to the vacuum pump (21) disposed in the circulation cooler housing (11) via a second vacuum line (27). One or more absorbers (28) are detachably connected to the vacuum pump (21) via a blow line (29) disposed outside the circulation cooler housing (11).

The second condenser (24) is detachably attached via a tubular cooling coil end (30a) of its cooling coil (30) and a coupling (36) to the inlet line (13) coming from the heat exchanger (12), into which line a pump (31) is disposed within the circulation cooler housing (11); the other tubular cooling coil end (30b) is detachably attached to the inlet (5) of the cooling coil (7) of the first condenser (4).

As noted above, the vacuum line (26) extends from the first condenser (4) and its connector (8) into the second condenser (24), and the second vacuum line (27) extends from the second condenser (24) into the circulation cooler housing (11) and to the vacuum pump (21), and from this second vacuum line (27), one line (32, 33) for each of the adjustment and measurement devices (22, 23), respectively, leads away from the housing (11).

The second vacuum line (27) itself is separable by means of a coupling (37). The absorbers (28), disposed outside the circulation cooler housing (11), are formed by one or more replaceable activated charcoal filters or the like. Reversing valves (34) disposed in the blow line (29) are associated with the filters of the absorbers (28) so that, when needed, that is as soon as an absorber (28) loses its filtering power, the switch can be made over to the other absorber (28).

The vacuum adjustment device (22) is desirably formed by an artificial air leaking means, i.e. an air inlet (22a) and an adjusting element (22b) for the air flow entering through the inlet (22a) into the line (32) and thus into the vacuum line (27). A manometer is preferably provided as the vacuum indicating device (23). The absorber or absorbers (28) is or are separable from the line (29) by means of connection parts (35) for exchange or replacement purposes.

For the circulation cooling of the cooler (10), the forward flow line (13) with the inserted pump (31) leads away from the reservoir (15) and upwardly out of the housing (11), and is then connected as indicated above to the cooling coil end (30a) via the coupling (36) and leads through the other cooling coil end (30b) as far as to the connector (5) of the condenser (4). As it comes from the return connector (6) of the first condenser (4), the return line (14) leads through the lid (15a) of the reservoir (15) and terminates above the surface of the cooling liquid in the reservoir (15).

The housing (11) comprises a lower part and a removable upper part or side part, so that its interior is easily accessible for exchanges or replacements or maintenance. Openings in the form of grids (38) are associated with the cooling unit (17, 18) and the vacuum pump (21) for the entrance and exit of air.

The above-described circulation cooler (10) operates in the following manner:

The condenser (4) of the distillation apparatus (1) is connected to the aftercondenser (24) and, via the lines (14, 13, 27), to the circulation cooler (10). The cooling unit (17, 18) and the pump (21) are activated, so that the cooling liquid in the reservoir (15) is maintained at the desired or required cooling temperature, and the cooling liquid (25) in the loop is brought into the cooling coil (30) of the second condenser (24) by means of the line (13), then passes through such cooling coil (30) and then flows through the line (30b) into the cooling coil (7) of the condenser (4) and likewise passes through this cooling coil (7). Afterwards, the cooling liquid (25) flows back through the line (14) into the reservoir (15), by means of which the cooling loop is closed.

At the same time, the vacuum pump (21) is activated and, by means of the artificial leak (22a), the desired or required vacuum in the vapor pressure range of the liquid to be distilled is adjusted, and can be read off the manometer (23). In the process a vacuum is generated in the two condensers (4, 24) by the vacuum pump (21), via the line (27), the condenser (24) and the line (26), once again in the closed vacuum loop.

The vapors that are not condensed in the condenser (4), i.e. those which slip through the condenser (4), are brought by the vacuum into the condenser (24) via the line (26) and are condensed on its cooling coil (30). If not all of the vapors are condensed, even in the second condenser (24), they flow again, in the form of aerosols, through the line (27) and the pump (21) into the absorber (28) and are completely absorbed there, preventing the exit of aerosols from the line (29) to the outside.

To control the cooling unit (17, 18) and thus to keep the cooling liquid in the reservoir (15) permanently at the same temperature, a temperature probe (39) is provided within the cooling liquid (25) and is connected to a temperature selector (41) disposed on the housing (15), which is connected to the compressor via a control line (42).

During the cooling process the vacuum pump (21) is constantly activated. To be able to also switch off the vacuum pump (21) in the cooling mode, a vacuum tank (43) that is connected to the vacuum line (27) via a line (44), which thus generates and maintains a vacuum in both condensers (4, 24), can be disposed in the housing (11), in an expanded embodiment of the circulation cooler (10) in accordance with the invention.

To assure and maintain this vacuum when the vacuum pump (21) is not in operation, a return valve (45) is interposed in the line (27), downstream of the line (44) and upstream of the line (32). The vacuum tank (43) is connected to the vacuum pump (21) via a line (46) with an inserted, adjustable pressure selector (47), by means of which the desired vacuum in the tank (43) can be set.

It is within the scope of the invention to also connect more than one distillation apparatus (1) to the circulation cooler (10). Then a common or separate heat exchanger (12) and a vacuum pump (21) are provided in the housing (11) for each distillation apparatus (1).

The aftercondenser (24) disposed outside the circulation cooler (10) permits easy removal of the solvent collecting within, and has a blockable drain cock (24a) for this purpose.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A circulation cooler and condenser for a vacuum distillation apparatus, comprising a vacuum distillation apparatus (1);
   a circulation cooler (10) including a circulation cooler housing (11) having disposed therein:
   (a) a heat exchanger (12) having a reservoir (15) for containing a cooling liquid (25), said reservoir having an inlet line (13) and a return line (14), and a cooling coil (16) disposed therein;
   (b) a cooling unit (17, 18) connected by a forward flow (19) and a return (20) to said cooling coil (16) of said reservoir (15); and
   (c) a vacuum pump (21), and a vacuum adjustment device (22) and a vacuum measurement device (23) provided outside of said circulation cooler housing (11),
   a secondary condenser means (24) disposed outside said circulation cooler housing (11) for after-condensation of vapors passing from the vacuum distillation apparatus, a vacuum line means (26) for passing vapors to said secondary condenser means, said secondary condenser means having a cooling coil (30) therewithin located along said inlet line (13) for the passage of cooling liquid (25) from said heat exchanger (12) through said cooling coil (30) and then to the vacuum distillation apparatus, said secondary condenser means (24) being detachably connectable to the vacuum distillation apparatus via said vacuum line means (26) and being detachably connected through a second line means (26) and being detachably connected through a second vacuum line (27) to said vacuum pump (21); and
   an absorber (28) detachably connected to said vacuum pump (21) through a blow line (29) disposed outside said circulation cooler housing (11).

2. A circulation cooler and condenser in accordance with claim 1 connected to said vacuum distillation apparatus, said vacuum distillation apparatus comprising a primary condenser (4) including
   (d) a primary cooling coil (7) disposed therewithin and having an outlet connected to said return line (14), said cooling coil (7) having an inlet connected to said cooling coil 30 of said secondary condenser means (24) for receiving cooling liquid (25) passing from said reservoir (15) through said cooling coil 30 of said secondary condenser means (24) and then to said primary cooling coil (7) of said primary condenser, and then for return of cooling liquid (25) from said primary cooling coil (7) through said return line (14) to said reservoir (15),
   (e) a heatable rotary flask (3) for containing a liquid substance to be distilled, and
   (f) A collecting flask (9) for receiving a distilled and condensed substance.

3. The circulation cooler as defined by claim 1, wherein said absorber (28), disposed outside said circulation cooler housing (11), is formed by at least one replaceable activated charcoal filters.

4. The circulation cooler as defined by claim 1, wherein said secondary condenser means (24) has a blockable drain cock (24a) in the lower end area for removal of solvent collecting in said secondary condenser means (24).

5. A circulation cooler and condenser for a vacuum distillation apparatus, comprising a vacuum distillation apparatus (1);
   a circulation cooler (10) including a circulation cooler housing (11) having disposed therein:
   (a) a heat exchanger (12) having a reservoir (15) for containing a cooling liquid (25), said reservoir having an inlet line (13) and a return line (14), and a cooling coil (16) disposed therein;
   (b) a cooling unit (17, 18) connected by a forward flow (19) and a return (20) to said cooling coil (16) of said reservoir (15); and
   (c) a vacuum pump (21), and a vacuum adjustment device (22) and a vacuum measurement device (23) provided outside of said circulation cooler housing (11),
   connecting means for detachably connecting said circulation cooler to (a) said vacuum distillation apparatus;
   a secondary condenser means (24) disposed outside said circulation cooler housing (11) for after-condensation of vapors received from the vacuum distillation apparatus, said secondary condenser means comprising a cooling coil (30) having a cooling coil end (30a), and connection means for detachably connecting said cooling (30) by said cooling coil end (30a) to said inlet line (13) coming from said heat exchanger (12) for the passage of cooling liquid (25) from said heat exchanger (12) to the vacuum distillation apparatus, said secondary condenser means (24) being detachably connectable to the vacuum distillation apparatus, and being detachably connected through a second vacuum line (27) to said vacuum pump (21);
   a pump means (31) for pumping cooling liquid through said inlet line (13);
   said cooling coil (30) of said secondary condenser means (24) having a cooling coil discharge end (30b) for connection to the vacuum distillation apparatus; and
   an absorber (28) detachably connected to said vacuum pump (21) through a blow line (29) disposed outside said circulation cooler housing (11).

6. The circulation cooler as defined by claim 5, wherein said absorber (28), disposed outside said circulation cooler housing (11), is formed by at least one replaceable activated charcoal filters.

7. The circulation cooler as defined by claim 5, wherein said secondary condenser means (24) has a blockable drain cock (24a) in the lower end area for removal of solvent collecting in said secondary condenser means (24).

8. A circulation cooler and condenser for a vacuum distillation apparatus, comprising a vacuum distillation apparatus (1);
- a circulation cooler (10) including a circulation cooler housing (11) having disposed therein:
  - (a) a heat exchanger (12) having a reservoir (15) for containing a cooling liquid (25), said reservoir having an inlet line (13) and a return line (14), and a cooling coil (16) disposed therein;
  - (b) a cooling unit (17, 18) connected by a forward flow (19) and a return (20) to said cooling coil (16) of said reservoir (15); and
  - (c) a vacuum pump (21), having a vacuum line (27) and a vacuum adjustment device (22) and a vacuum measurement device (23) provided outside of said circulation cooler housing (11),
- connecting means for detachably connecting said circulation cooler to said vacuum distillation apparatus;
- a secondary condenser means (24) disposed outside said circulation cooler housing (11) for after-condensation of vapors passing from the vacuum distillation apparatus through a vacuum line (26), the vacuum line (26) from a first condenser (4) leading into said second condenser means (24), sad secondary condenser means (24) being located along said inlet line (13) for the passage of cooling liquid (25) from said heat exchanger (12) to the vacuum distillation apparatus, said secondary condenser means (24) being detachably connectable to the vacuum distillation apparatus via said vacuum line (26), and being detachably connected through said second vacuum line (27) to said vacuum pump (21), said vacuum line (27) leads from said second condenser (24) into said circulation cooler housing (11) to said vacuum pump (21), said vacuum line (27) being separable by means of an inserted coupling (37) located outside said circulation cooler housing (11); and
- an absorber (28) detachably connected to said vacuum pump (21) through a blow line (29) disposed outside said circulation cooler housing (11).

9. The circulation cooler as defined by claim 8, wherein said absorber (28), disposed outside said circulation cooler housing (11), is formed by at least one replaceable activated charcoal filters.

10. The circulation cooler as defined by claim 8, wherein said secondary condenser means (24) has a blockable drain cock (24a) in the lower end area for removal of solvent collecting in said secondary condenser means (24).

* * * * *